(12) United States Patent
Fujii (10) Patent No.: US 8,692,960 B2
(45) Date of Patent: Apr. 8, 2014

(54) LIQUID CRYSTAL DISPLAY DEVICE

(75) Inventor: Toshio Fujii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 182 days.

(21) Appl. No.: 13/497,369

(22) PCT Filed: Sep. 27, 2010

(86) PCT No.: PCT/JP2010/066699
§ 371 (c)(1),
(2), (4) Date: Mar. 21, 2012

(87) PCT Pub. No.: WO2011/040370
PCT Pub. Date: Apr. 7, 2011

(65) Prior Publication Data
US 2012/0188480 A1    Jul. 26, 2012

(30) Foreign Application Priority Data
Sep. 30, 2009   (JP) ................. 2009-227650

(51) Int. Cl.
*G02F 1/1335*  (2006.01)
*G02F 1/1347*  (2006.01)

(52) U.S. Cl.
USPC ............. 349/106; 349/78; 349/80; 349/108

(58) Field of Classification Search
CPC .......... G02F 1/133514; G02F 1/133512; G02F 1/133516; G02F 1/133555; G02F 1/13473; G02F 1/1396; G02F 1/133533; G02F 1/13363; G02F 1/1393; G02F 1/103; G02F 2001/52; G02F 1/134327; G02B 5/201
USPC ................. 349/106, 78, 80, 108
See application file for complete search history.

(56) References Cited

U.S. PATENT DOCUMENTS

| | | | |
|---|---|---|---|
| 7,268,757 B2 | 9/2007 | Ben-David et al. | |
| 7,483,095 B2 * | 1/2009 | Roth et al. | 349/106 |
| 7,626,659 B2 * | 12/2009 | Takizawa | 349/106 |
| 7,760,177 B2 | 7/2010 | Nakamura et al. | |

(Continued)

FOREIGN PATENT DOCUMENTS

| | | |
|---|---|---|
| EP | 2 101 312 A1 | 9/2009 |
| JP | 2001-209047 A | 8/2001 |
| WO | 2007/034770 A1 | 3/2007 |
| WO | 2007/148519 A1 | 12/2007 |

OTHER PUBLICATIONS

Official Communication issued in International Patent Application No. PCT/JP2010/066699, mailed on Dec. 14, 2010.

(Continued)

*Primary Examiner* — Mike Qi
(74) *Attorney, Agent, or Firm* — Keating & Bennett, LLP (57) ABSTRACT

A liquid crystal display device (100) according to the present invention has a pixel (P), which includes red, green, blue and yellow subpixels (R, G, B and Y). The chromaticity of the yellow subpixel (Y) is outside of a triangle that is defined by connecting together the respective chromaticities of the red, green and blue subpixels (R, G and B). And the respective aperture areas $S_R$, $S_G$, $S_B$ and $S_Y$ of the red, green, blue, and yellow subpixels (R, G, B and Y) and the respective transmittances $T_R$, $T_G$, $T_B$ and $T_Y$ of their associated red, green, blue, and yellow color filters (CR, CG, CB and CY) satisfy the inequality $T_Y > [(S_R + S_G + S_B + S_Y)(T_R + T_G + T_B) - 3(S_R \times T_R + S_G \times T_G + S_B \times T_B)]/3S_Y$.

5 Claims, 7 Drawing Sheets

(56) References Cited

U.S. PATENT DOCUMENTS

2005/0140907 A1 6/2005 Yun
2009/0115952 A1 5/2009 Nakamura et al.
2009/0141221 A1 6/2009 Taguchi et al.

OTHER PUBLICATIONS

English translation of Official Communication issued in corresponding International Application PCT/JP2010/066699, mailed on May 18, 2012.

* cited by examiner

LIQUID CRYSTAL DISPLAY DEVICE

TECHNICAL FIELD

The present invention relates to a liquid crystal display device and more particularly relates to a liquid crystal display device that conducts a display operation using four primary colors.

BACKGROUND ART

LCDs have a number of advantages, including their lighter weight, reduced thickness and smaller power dissipation, over other kinds of display devices, and have been used as not only a display device with a small screen such as the monitor of a cellphone but also the big screen of a TV set. In color LCDs that are used extensively today, one pixel consists of three subpixels representing the three primary colors of light, namely, red (R), green (G) and blue (B), and the color difference between those colors red, green and blue is typically made by color filters.

In general, in order to expand a color reproduction range, the concentration of a pigment in a color filter is increased. However, the higher the concentration of a pigment, the lower the transmittance of its color filter layer, thus making it impossible to achieve a high luminance.

Recently, display devices that add four or more primary colors together have been proposed (see Patent Documents Nos. 1 to 3, for example) as a replacement for an ordinary display device that uses the three primary colors. Such a display device that uses four or more primary colors is sometimes called a "multi-primary-color display device". A multi-primary-color display device could expand the color reproduction range relatively easily.

CITATION LIST

Patent Literature

Patent Document No. 1: U.S. Pat. No. 7,268,757
Patent Document No. 2: PCT International Application Publication No. 2007/034770
Patent Document No. 3: PCT International Application Publication No. 2007/148519

SUMMARY OF INVENTION

Technical Problem

However, even a multi-primary-color display device could not achieve high luminance simply by expanding the color reproduction range because the transmittance of its color filter layer would decrease in that case.

It is therefore an object of the present invention to provide a liquid crystal display device that can expand the color reproduction range with such a decrease in the transmittance of its color filter layer minimized.

Solution to Problem

A liquid crystal display device according to the present invention has a pixel, which includes red, green, blue and yellow subpixels, and includes a backlight, and a liquid crystal panel. The liquid crystal panel includes a color filter layer that has red, green, blue and yellow color filters associated with the red, green, blue and yellow subpixels, respectively. The chromaticity of the yellow subpixel is outside of a triangle that is defined by connecting together the respective chromaticities of the red, green and blue subpixels. And the respective aperture areas $S_R$, $S_G$, $S_B$ and $S_Y$ of the red, green, blue, and yellow subpixels and the respective transmittances $T_R$, $T_G$, $T_B$ and $T_Y$ of the red, green, blue, and yellow color filters satisfy the inequality $T_Y > [(S_R + S_G + S_B + S_Y)(T_R + T_G + T_B) - 3(S_R \times T_R + S_G \times T_G + S_B \times T_B)]/3S_Y$.

In one embodiment, at least one of the red, green, blue, and yellow subpixels has a different aperture area from any of the other subpixels.

In one embodiment, the red subpixel has a larger aperture area than the green and yellow subpixels, and the blue subpixel has a larger aperture area than the green and yellow subpixels.

In one embodiment, the respective aperture areas of the red, green, blue, and yellow subpixels are substantially equal to each other.

In one embodiment, the transmittance of the yellow color filter is higher than the arithmetic mean of the respective transmittances of the red, green and blue color filters.

Advantageous Effects of Invention

The present invention provides a liquid crystal display device that can expand the color reproduction range with a decrease in the transmittance of its color filter layer minimized.

DESCRIPTION OF EMBODIMENTS

Hereinafter, preferred embodiments of a liquid crystal display device according to the present invention will be described with reference to the accompanying drawings. It should be noted, however, that the present invention is in no way limited to the specific preferred embodiments to be described below.

Figure 1:
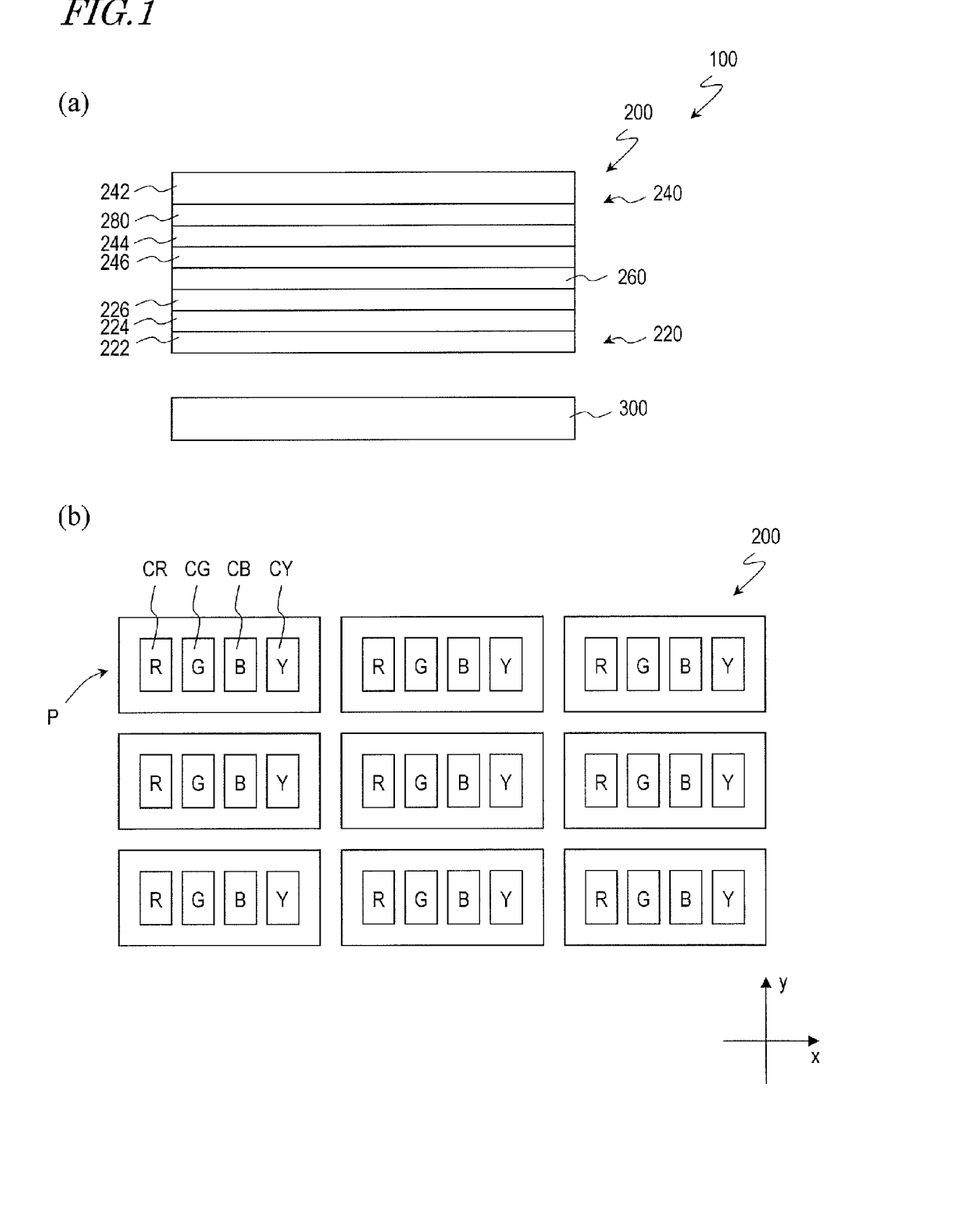
FIG. 1(a) is a schematic representation illustrating a liquid crystal display device as a specific preferred embodiment of the present invention.
FIG. 1(b) is a schematic representation illustrating the LCD panel of the liquid crystal display device shown in FIG. 1(a).

FIG. 1(a) is a schematic representation illustrating a liquid crystal display device 100 as a specific preferred embodiment of the present invention. The liquid crystal display device 100 includes an LCD panel 200 and a backlight 300. The LCD panel 200 includes a rear substrate 220, a front substrate 240, a liquid crystal layer 260 interposed between the rear and front substrates 220 and 240, and a color filter layer 280. In this case, the rear substrate 220 includes an insulating substrate 222, pixel electrodes 224, and a first alignment film 226. On the other hand, the front substrate 240 includes an insulating substrate 242, a counter electrode 244 and a second alignment film 246. In this example, the color filter layer 280 is arranged between the insulating substrate 242 of the front substrate 240 and the counter electrode 244.

Although not shown, two polarizers are provided for the rear and front substrates 220 and 240, respectively, and are arranged so that their polarization axes satisfy the crossed Nicols relation. For example, lines, insulating layers and other members (not shown, either) are arranged on the rear substrate 220. The liquid crystal layer 260 has a substantially uniform thickness.

FIG. 1(b) is a schematic representation illustrating the LCD panel 200, which has a number of pixels P that are arranged in columns and rows to form a matrix pattern. Each pixel P is defined by its associated pixel electrode 124 and is made up of red, green, blue, and yellow subpixels R, G, B and Y, which are arranged in the row direction (i.e., in the x direction) and can have their luminances controlled independently of each other. In this manner, the LCD panel 200 conducts a display operation in the four primary colors of red, green, blue, and yellow.

The LCD panel 200 is a transmission type, and each of those subpixels R, G, B and Y has a transmitting area in the LCD panel 200. The light emitted from the backlight 300 is modulated by the LCD panel 200 to display an image as intended. In this example, the respective transmitting areas (i.e., the aperture areas) of the red, green, blue, and yellow subpixels R, G, B and Y are substantially equal to each other.

The color filter layer 280 has red, green, blue, and yellow color filters CR, CG, CB and CY, which are associated with the red, green, blue, and yellow subpixels R, G, B and Y, respectively. The color filter layer 280 may be formed by subjecting a color photoresist film to a photoresist process.

Optionally, the LCD panel 200 may further include a multi-primary-color converting section (not shown) that converts an input video signal that is compatible with a normal three primary color display device. The multi-primary-color converting section converts the grayscale level of the input video signal into a grayscale level associated with the LCD panel 200. If necessary, the multi-primary-color converting section may have a lookup table for use to convert the grayscale levels of the three primary colors represented by the input video signal into those of the red, green, blue, and yellow subpixels.

The backlight 300 includes blue-emitting and red/green-fluorescent type LEDs. In the spectrum of the emitted light, the peak of the radiant intensity representing the color blue is higher than those of the radiant intensities representing the colors green and red, and the peak of the radiant intensity representing the color green is higher than that of the radiant intensity representing the colors red.

Figure 2:
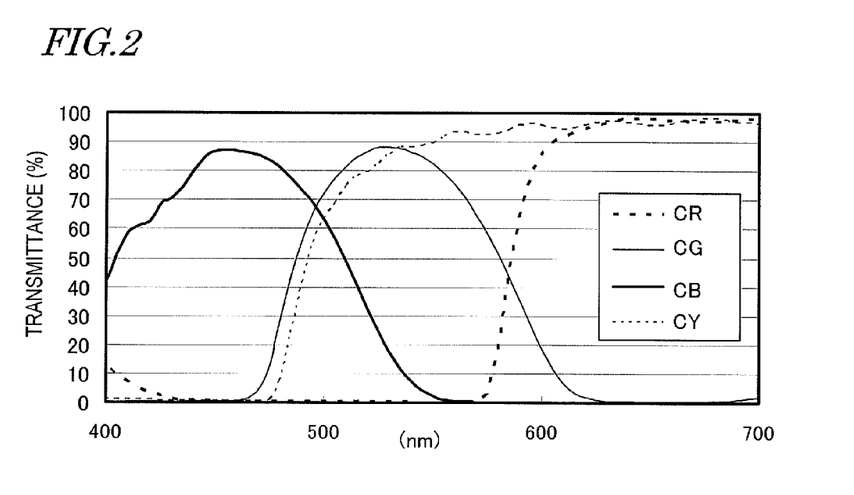
FIG. 2 is a graph showing the respective transmission spectra of the color filters in the liquid crystal display device shown in FIG. 1.

FIG. 2 shows the transmission spectra of the red, green, blue, and yellow color filters CR, CG, CB and CY. In FIG. 2, the transmission spectra of the red, green, blue, and yellow color filters CR, CG, CB and CY are identified by CR, CG, CB and CY, respectively. The transmission spectrum of the blue color filter CB has a peak at a wavelength of around 450 nm. The transmission spectrum of the green color filter CG has a peak at a wavelength of around 530 nm. The yellow color filter CY exhibits a transmittance of 90% or more at a wavelength of 500 nm to 700 nm and the red color filter CR exhibits a transmittance of 90% or more at a wavelength of 610 nm to 700 nm. These transmission spectra are measured with a spectrophotometer.

Figure 3:
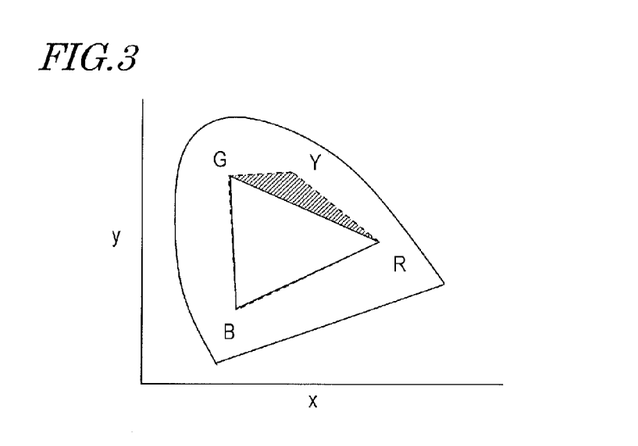
FIG. 3 shows an xy chromaticity diagram representing the chromaticities of respective subpixels in the liquid crystal display device shown in FIG. 1.

FIG. 3 shows an xy chromaticity diagram representing the chromaticities of respective subpixels in the liquid crystal display device 100. In FIG. 3, R, G, B and Y denote the respective chromaticities of their associated subpixels. For example, R denotes the chromaticity of the liquid crystal display device 100 in a situation where the red subpixel has the highest luminance and the other subpixels have the lowest luminance. The color reproduction range of the liquid crystal display device 100 is represented by a quadrilateral, of which the four vertices are defined by R, G, B and Y, respectively.

In the liquid crystal display device 100 of this preferred embodiment, the chromaticity (x, y) of the yellow subpixel Y is outside of the triangle that is defined by connecting together the respective chromaticities (x, y) of the red, green and blue subpixels R, G and B. For that reason, this liquid crystal display device 100 can conduct a display operation in a broader color reproduction range.

Also, in the liquid crystal display device 100 of this preferred embodiment, the respective aperture areas $S_R$, $S_G$, $S_B$ and $S_Y$ of the red, green, blue, and yellow subpixels R, G, B and Y and the respective transmittances $T_R$, $T_G$, $T_B$ and $T_Y$ of their associated red, green, blue, and yellow color filters CR, CG, CB and CY satisfy the inequality $$T_Y > [(S_R + S_G + S_B + S_Y)(T_R + T_G + T_B) - 3(S_R \times T_R + S_G \times T_G + S_B \times T_B)]/3S_Y \quad (A)$$

In the following description, the "transmittance" will herein mean the ratio of the intensity of outgoing light to that of incoming light, unless stated otherwise. The transmittances $T_R$, $T_G$, $T_B$ and $T_Y$ vary not only with the transmission spectra of those color filters CR, CG, CB and Cy themselves but also with the spectrum of the light that has entered the color filter layer 280. Strictly speaking, even if the red, green, blue, and yellow color filters CR, CG, CB and CY have the same transmission spectrum, the transmittances $T_R$, $T_G$, $T_B$ and $T_Y$ will still vary with the spectrum of the light emitted from the backlight 300 and with the wavelength dependence of the optical transmittance of a member that is arranged between the surface of the LCD panel 200 on which incoming light has been incident and the color filter layer 280. Generally speaking, the transmittance of any member in the LCD panel 200, other than the red, green, blue, and yellow color filters CR, CG, CB and CY, will exhibit almost no wavelength dependence in the visible radiation range. That is why the transmittances $T_R$, $T_G$, $T_B$ and $T_Y$ of the red, green, blue, and yellow color filters CR, CG, CB and CY will change with their own transmission spectra and the spectrum of the light emitted from the backlight 300.

As will be described in detail later, if the transmittances $T_R$, $T_G$, $T_B$ and $T_Y$ of the red, green, blue, and yellow color filters CR, CG, CB and CY in the color filter layer 280 do satisfy the relation described above, the overall color filter layer 280 can have a relatively high transmittance. Consequently, even if the intensity of the light emitted from the backlight 300 is not increased by dissipating more power, a display operation can still be conducted with high luminance.

In the following description, the (average) transmittance per pixel of the color filter layer 280 will be identified herein by $T\alpha$ and the area of each single pixel by $S\alpha$, respectively. If the light that has been incident on a single pixel P has a luminous intensity L per unit area, the intensity $I_{IN}$ of the light that has been incident on the color filter layer 280 can be given by $L \times S\alpha$ and the intensity $I_{OUT}$ of the outgoing light can be calculated by $L \times S_R \times T_R + L \times S_G \times T_G + L \times S_B \times T_B + L \times S_Y \times T_Y$. Consequently, the average transmittance $T\alpha$ ($=I_{OUT}/I_{IN}$) of the color filter layer 280 is represented by $(S_R \times T_R + S_G \times T_G + S_B \times T_B + S_Y \times T_Y)/S\alpha$.

Figure 4:
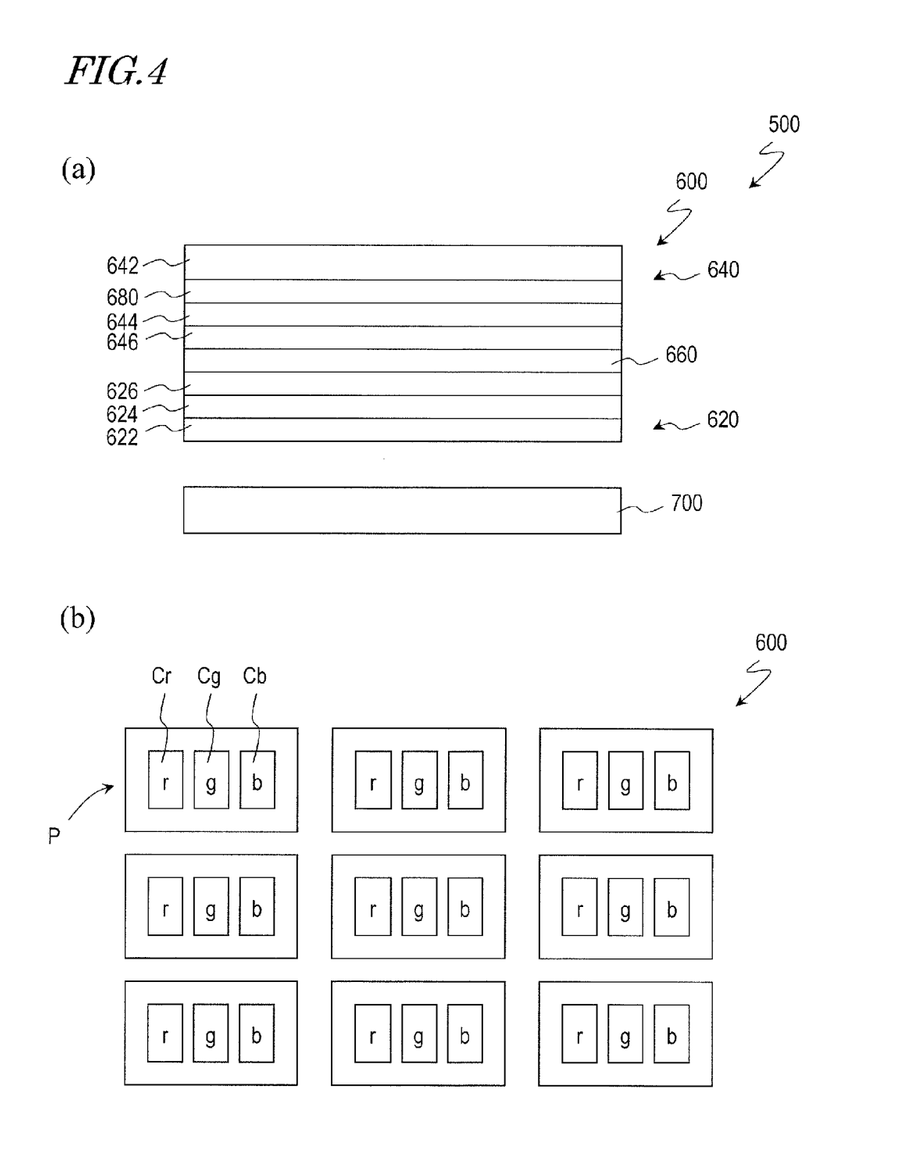
FIG. 4(a) is a schematic representation illustrating a liquid crystal display device as a comparative example.
FIG. 4(b) is a schematic representation illustrating the LCD panel of the liquid crystal display device shown in FIG. 4(a).

Hereinafter, it will be described what advantages the liquid crystal display device 100 of this preferred embodiment has over a liquid crystal display device as a comparative example. First of all, a liquid crystal display device as a comparative example will be described with reference to FIG. 4.

FIG. 4(a) is a schematic representation illustrating a liquid crystal display device 500 as a comparative example. The liquid crystal display device 500 conducts a display operation using the three primary colors of red, green and blue, and has quite the same configuration as the liquid crystal display device 100 described above except that each pixel of the liquid crystal display device 500 does not have the yellow subpixel Y.

The liquid crystal display device 500 includes an LCD panel 600 and a backlight 700. The LCD panel 600 includes a rear substrate 620, a front substrate 640, a liquid crystal layer 660 interposed between the rear and front substrates 620 and 640, and a color filter layer 680. In this example, the color filter layer 680 is arranged between the insulating substrate 642 of the front substrate 640 and the counter electrode 644. It should be noted that the color filter layer 680 of the LCD panel 600 has a different transmittance from the color filter layer 280 of the LCD panel 200 and that the light emitted from the backlight 700 has a different spectrum from the one emitted from the backlight 300.

FIG. 4(b) is a schematic plan view illustrating the LCD panel 600, in which each pixel P has red, green and blue subpixels r, g and b. In the liquid crystal display device 500, the red, green and blue subpixels r, g and b have substantially equal aperture areas within each single pixel.

In the liquid crystal display device 500, the color filter layer 680 has red, green and blue color filters Cr, Cg and Cb, each of which is made of the same material as its counterpart (i.e., red, green or blue color filter CR, CG or CB) of the color filter layer 280 of the liquid crystal display device 100.

Figure 5:
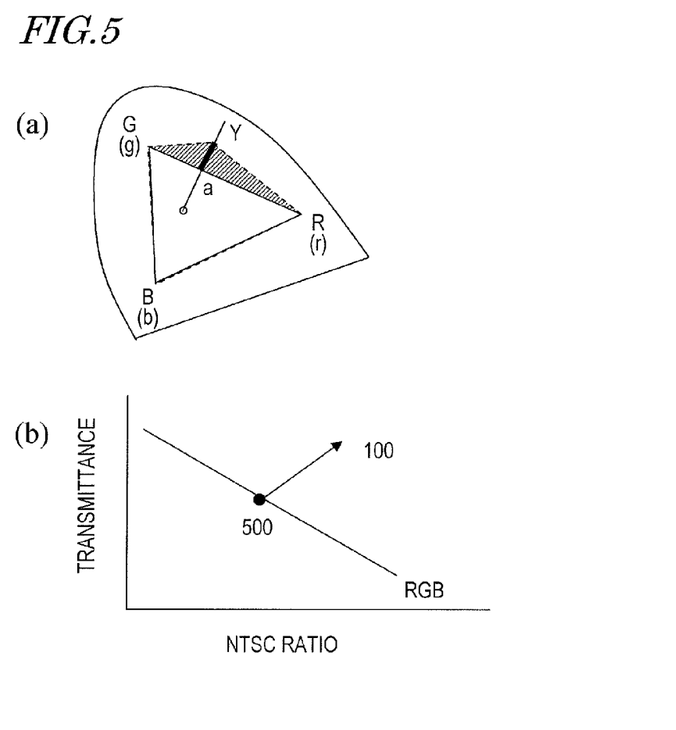
FIG. 5(a) is a chromaticity diagram showing the respective color reproduction ranges of the liquid crystal display device shown in FIG. 1 and the liquid crystal display as the comparative example.
FIG. 5(b) is a graph showing how the transmittance changes with the NTSC ratio in the liquid crystal display device shown in FIG. 1 and in the liquid crystal display device as the comparative example.

Hereinafter, the respective color reproduction ranges of the liquid crystal display device 100 of this preferred embodiment and the liquid crystal display device 500 will be compared to each other. FIG. 5(a) is a chromaticity diagram showing the respective color reproduction ranges of the liquid crystal display device 100 of this preferred embodiment and the liquid crystal display device 500 in comparison. In FIG. 5, R, G, B and Y denote the respective chromaticities of the red, green, blue, and yellow subpixels R, G, B and Y of the liquid crystal display device 100 and r, g, and b denote the respective chromaticities of the red, green, and blue subpixels r, g, and b of the liquid crystal display device 500.

The respective chromaticities of the red, green and blue subpixels R, G and B in the liquid crystal display device 100 are substantially equal to those of the red, green and blue subpixels r, g and b in the liquid crystal display device 500. In the liquid crystal display device 100, however, the chromaticity of the yellow subpixel Y is located outside of the triangle that is defined by connecting together the respective chromaticities of the red, green and blue subpixels R, G and B. That is why the liquid crystal display device 100 can conduct a display operation in a broader color reproduction range than the liquid crystal display device 500. Although their difference has been described by reference to the xy chromaticity diagram, the chromaticity of the yellow subpixel Y is also located outside of the triangle that is defined by connecting together the respective chromaticities of the red, green and blue subpixels R, G and B even when a u'v' chromaticity diagram is used.

Next, the transmittances of the respective color filter layers 280 and 680 of the liquid crystal display device 100 and the liquid crystal display device 500 will be compared to each other.

In the following description, the transmittances of the red, green and blue color filters Cr, Cg and Cb in the color filter layer 680 will be identified herein by $T_r$, $T_g$ and $T_b$, respectively, and the (average) transmittance per pixel of the color filter layer 680 by $T\beta$, respectively. The aperture areas of the red, green and blue subpixels r, g and b of the liquid crystal display device 500 will be identified herein by $S_r$, $S_g$ and $S_b$ and the area of each single pixel by $S\beta$, respectively. In that case, the average transmittance $T\beta$ of the color filter layer 680 is calculated by $(S_r \times T_r + S_g \times T_g + S_b \times T_b)/S\beta$.

As described above, each of the red, green and blue color filters Cr, Cg and Cb of the color filter layer 680 is made of the same material as its counterpart (i.e., red, green or blue color filter CR, CG or CB) of the color filter layer 280. That is why the transmission spectra of the red, green and blue color filters Cr, Cg and Cb will be almost the same as those of the red, green and blue color filters CR, CG and CB shown in FIG. 2. Strictly speaking, the spectrum of the light emitted from the backlight 700 is different from that of the light emitted from the backlight 300. However, their difference is so slight that it can be said that the backlights 700 and 300 have substantially the same spectra of outgoing light. For that reason, the transmittances $T_r$, $T_g$ and $T_b$ of the red, green and blue color filters Cr, Cg and Cb of the liquid crystal display device 500 are respectively substantially equal to the transmittances $T_R$, $T_G$ and $T_B$ of the red, green and blue color filters CR, CG and CB of the liquid crystal display device 100. Consequently, $T_R=T_r$, $T_G=T_g$, and $T_B=T_b$ are satisfied.

In this case, to avoid complicating the description overly, the area $S\beta$ of each single pixel in the liquid crystal display device 500 is supposed to be equal to the area $S\alpha$ of each single pixel in the liquid crystal display device 100. For example, if the screen size and the number of pixels (i.e., the resolution) of the liquid crystal display device 500 are the same as those of the liquid crystal display device 100, the area $S\beta$ of each single pixel P in the liquid crystal display device 500 is substantially equal to the area $S\alpha$ of each single pixel in the liquid crystal display device 100.

Also, the sum of the respective aperture areas $S_R$, $S_G$, $S_B$ and $S_Y$ of the four subpixels R, G, B and Y of each single pixel in the liquid crystal display device 100 is substantially equal to that of the respective aperture areas $S_r$, $S_g$, and $S_b$ of the three subpixels r, g, and b of each single pixel in the liquid crystal display device 500. Thus, $S_R+S_G+S_B+S_Y=S_r+S_g+S_b$ is satisfied. Consequently, the area of the opaque portion of each pixel (e.g., a portion covered with a black matrix) in the liquid crystal display device 100 is almost equal to that of the opaque portion of each pixel in the liquid crystal display device 500. For example, if the black matrix has a constant width in both of these liquid crystal display devices 100 and 500, the area of the opaque portion of each pixel in the liquid crystal display device 100 is actually larger than that of the opaque portion of each pixel in the liquid crystal display device 500, strictly speaking. However, if the sum of the areas of those opaque portions is sufficiently smaller than that of the entire aperture areas in the liquid crystal display devices 100 and 500, substantially no problem should arise even if the difference in the sum of the areas of opaque portions between these liquid crystal display devices 100 and 500 was not taken into account. Consequently, it can be said that the sum of the aperture areas within each pixel in the liquid crystal display device 100 is almost equal to that of the aperture areas within each pixel in the liquid crystal display device 500. Alternatively, the width of the black matrix in the liquid crystal display device 100 may be narrower than that of the black matrix in the liquid crystal display device 500.

Also, in the liquid crystal display device 500, the three subpixels (namely, the red, green and blue subpixels r, g and b) have substantially equal aperture areas $S_r$, $S_g$ and $S_b$. Consequently, $S_r=S_g=S_b=(S_R+S_G+S_B+S_Y)/3$ is satisfied.

In the liquid crystal display device 100 of this preferred embodiment, the respective aperture areas $S_R$, $S_G$, $S_B$ and $S_Y$ of the red, green, blue, and yellow subpixels R, G, B and Y and the respective transmittances $T_R$, $T_G$, $T_B$ and $T_Y$ of the red, green, blue, and yellow color filters CR, CG, CB and CY satisfy the inequality (A). That is why the average transmittance Tα of the color filter layer 280 of the liquid crystal display device 100 is set to be higher than the average transmittance Tβ of the color filter layer 680 of the liquid crystal display device 500. This point will be described in detail below.

As described above, the average transmittance Tα is calculated by $(S_R \times T_R + S_G \times T_G + S_B \times T_B + S_Y \times T_Y)/S\alpha$ and the average transmittance Tβ is calculated by $(S_r \times T_r + S_g \times T_g + S_b \times T_b)/S\beta$.

That is why if the average transmittance Tα is higher than the average transmittance Tβ, then the relation described above can be represented as:

$$(S_R \times T_R + S_G \times T_G + S_B \times T_B + S_Y \times T_Y)/S\alpha > (S_r \times T_r + S_g \times T_g + S_b \times T_b)/S\beta$$

Also, since $T_R=T_r$, $T_G=T_g$, $T_B=T_b$, $S_r=S_g=S_b=(S_R+S_G+S_B+S_Y)/3$ and $S\alpha=S\beta$ are satisfied as described above, this inequality can be modified into $$(S_R \times T_R + S_G \times T_G + S_B \times T_B + S_Y \times T_Y) > (S_R+S_G+S_B+S_Y) \times (T_R+T_G+T_B)/3$$

And this inequality can be further modified into $$T_Y > [(S_R+S_G+S_B+S_Y)(T_R+T_G+T_B) - 3(S_R \times T_R + S_G \times T_G + S_B \times T_B)]/3S_Y$$

Consequently, if the transmittance $T_Y$ of the yellow color filter CY satisfies this relation, then the transmittance of the color filter layer 280 becomes higher than that of the color filter layer 680 that is made of the same material. As a result, a high luminance can be displayed easily.

As described above, in the liquid crystal display device 100 of this preferred embodiment, the aperture areas $S_R$, $S_G$, $S_B$ and $S_Y$ of the red, green, blue, and yellow subpixels R, G, B and Y are substantially equal to each other. Then, Inequality (A) can be modified into $$T_Y > (T_R+T_G+T_B)/3 \tag{B}$$

Thus, in the liquid crystal display device 100 of this preferred embodiment, the transmittance $T_Y$ of the yellow color filter CY is higher than the arithmetic mean of the respective transmittances $T_R$, $T_G$ and $T_B$ of the red, green and blue color filters CR, CG and CB (i.e., $(T_R+T_G+T_B)/3$), and therefore, the transmittance of the color filter layer 280 becomes higher than that of the color filter layer 680, which is made of the same material as the former color filter layer 280. As a result, a high luminance can be displayed easily. If the four subpixels (i.e., the red, green, blue, and yellow subpixels R, G, B and Y) have substantially equal aperture areas $S_R$, $S_G$, $S_B$ and $S_Y$ in the liquid crystal display device 100, then the aperture areas $S_r$, $S_g$ and $S_b$ of the respective subpixels r, g and b of the liquid crystal display device 500 are greater than the aperture areas $S_R$, $S_G$, $S_B$ and $S_Y$ of the respective subpixels R, G, B and Y of the liquid crystal display device 100 and the ratio of the aperture areas of the subpixels can be represented as $S_R:S_G:S_B:S_Y:S_r:S_g:S_b=3:3:3:3:4:4:4$.

FIG. 5(*b*) is a graph showing how the transmittance of the color filter layer 280, 680 changes with the NTSC ratio of the liquid crystal display devices 100 and 500. As described above, if the NTSC ratio is increased by raising the concentration of a pigment in the color filters of a three-primary-color (RGB) display device, then the transmittance decreases.

In the liquid crystal display device 100 of this preferred embodiment, the chromaticity of the yellow subpixel Y is outside of the triangle that is defined by connecting together the respective chromaticities of the red, green and blue subpixels R, G and B, and the respective aperture areas $S_R$, $S_G$, $S_B$ and $S_Y$ of the red, green, blue, and yellow subpixels R, G, B and Y and the respective transmittances $T_R$, $T_G$, $T_B$ and $T_Y$ of the red, green, blue, and yellow color filters CR, CG, CB and CY satisfy the Inequality (A) described above. That is why the liquid crystal display device 100 has a higher NTSC ratio and the color filter layer 280 with a higher transmittance than the liquid crystal display device 500. Consequently, the liquid crystal display device 100 can conduct a high-luminance display operation in a broader color reproduction range.

Hereinafter, it will be described with reference to Tables 1 to 4 exactly what are the advantages of the liquid crystal display device 100 of this preferred embodiment over the liquid crystal display device 500 as a comparative example.

The following Table 1 shows the chromaticities x, y, u' and v' of the red, green and blue subpixels r, g and b in the liquid crystal display device 500 of the comparative example and the transmittances T of their associated color filters Cr, Cg and Cb:

TABLE 1

| Subpixel | x | y | u' | v' | T |
|---|---|---|---|---|---|
| Red subpixel | 0.639 | 0.333 | 0.447 | 0.524 | 19.0 |
| Green subpixel | 0.269 | 0.631 | 0.107 | 0.565 | 60.1 |
| Blue subpixel | 0.147 | 0.065 | 0.169 | 0.167 | 16.7 |

The following Table 2 shows their chromaticities x, y, u' and v' when the liquid crystal display device 500 of the Comparative example displays the color yellow and the color white:

TABLE 2

| Displayed color | x | y | u' | v' |
|---|---|---|---|---|
| Yellow | 0.408 | 0.518 | 0.194 | 0.555 |
| White | 0.244 | 0.234 | 0.183 | 0.395 |

In this case, the color yellow can be displayed by setting the luminance of the blue subpixel to be the lowest one and the luminances of the red and green subpixels to be the highest ones. The color white can be displayed by setting the luminance of every subpixel to be the highest one. The liquid crystal display device 500 has a color temperature of 32000 K.

In the liquid crystal display device 500 of such a comparative example, the color filter layer 680 has a transmittance of 31.9%. Also, the liquid crystal display device 500 of this comparative example has an NTSC ratio of 80.0% compliant with the CIE 1931 standard and an NTSC ratio of 86.7% compliant with the CIE 1976 standard.

Next, the liquid crystal display device 100 of this preferred embodiment will be described with reference to Tables 3 and 4. The following Table 3 shows the chromaticities x, y, u' and v' of the red, green, blue and yellow subpixels in the liquid crystal display device 100 of this preferred embodiment and the transmittances T of their associated color filters:

TABLE 3

| Subpixel | x | y | u' | v' | T |
|---|---|---|---|---|---|
| Red subpixel | 0.639 | 0.333 | 0.447 | 0.524 | 19.0 |
| Green subpixel | 0.269 | 0.631 | 0.107 | 0.565 | 60.1 |
| Blue subpixel | 0.147 | 0.065 | 0.169 | 0.167 | 16.7 |
| Yellow subpixel | 0.426 | 0.533 | 0.199 | 0.561 | 83.0 |

The following Table 4 shows their chromaticities x, y, u' and v' when the liquid crystal display device 100 of this preferred embodiment displays the color yellow and the color white:

TABLE 4

| Displayed color | x | y | u' | v' |
|---|---|---|---|---|
| Yellow | 0.416 | 0.526 | 0.197 | 0.372 |
| White | 0.294 | 0.316 | 0.189 | 0.305 |

In this case, the color yellow can be displayed by setting the luminance of the blue subpixel to be the lowest one and the luminances of the red, green and yellow subpixels to be the highest ones. The color white can be displayed by setting the luminance of every subpixel to be the highest one. The liquid crystal display device 100 has a color temperature of 78000 K.

In the liquid crystal display device 100, the chromaticities of the red, green and blue subpixels R, G and B are the same as those of their counterparts in the liquid crystal display device 500 but the chromaticity of the yellow subpixel Y is outside of the triangle that is defined by connecting together the respective chromaticities of the red, green and blue subpixels R, G and B. That is why the liquid crystal display device 100 has a broader color reproduction range than the liquid crystal display device 500. Also, as can be seen from Table 3, the transmittances $T_R$, $T_G$, $T_B$ and $T_Y$ of the red, green, blue, and yellow color filters CR, CG, CB and CY satisfy the Inequality (B) described above and the color filter layer 280 has a higher transmittance than the color filter layer 680. In the liquid crystal display device 100, the color filter layer 280 has a transmittance of 44.7%.

Figure 6:
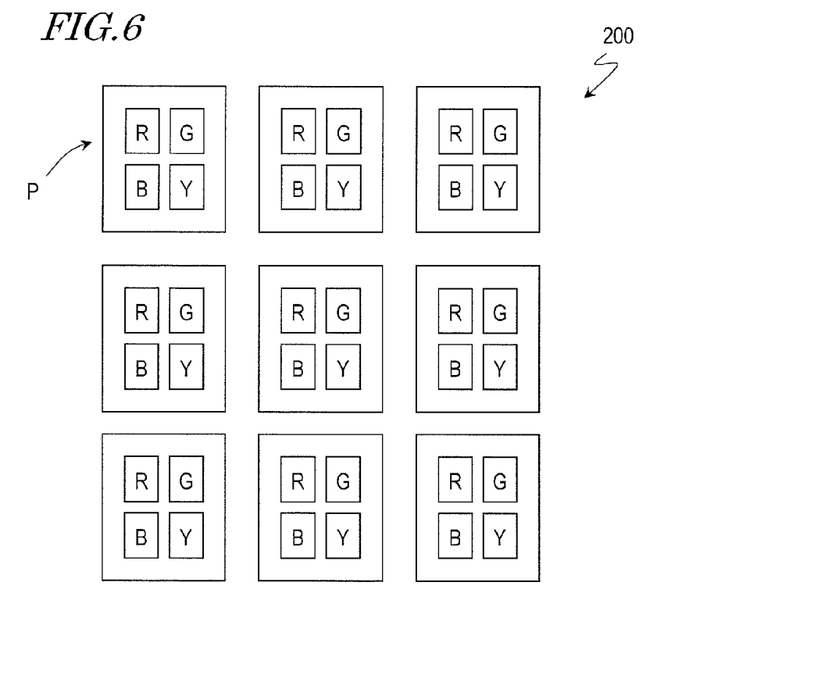
FIG. 6 is a schematic representation illustrating the LCD panel of a liquid crystal display device as another preferred embodiment of the present invention.

In the foregoing description, the red, green, blue, and yellow subpixels R, G, B and Y are supposed to be arranged in the Y direction. However, this is only an example of the present invention. Alternatively, the red, green, blue, and yellow subpixels R, G, B and Y may also be arranged in two columns and two rows to form a matrix pattern as shown in FIG. 6.

Also, in the foregoing description, the aperture areas $S_R$, $S_G$, $S_B$ and $S_Y$ of the red, green, blue, and yellow subpixels R, G, B and Y are supposed to be equal to each other. However, this is just an example of the present invention, too. Alternatively, the red, green, blue, and yellow subpixels R, G, B and Y may have aperture areas $S_R$, $S_G$, $S_B$ and $S_Y$ at a different ratio.

As described above, supposing each pixel P has the same area, the aperture area $S_R$ of the red subpixel R in the liquid crystal display device 100 is smaller than the aperture area $S_r$ of the red subpixel r in the liquid crystal display device 500 of the comparative example. That is why sometimes the liquid crystal display device 100 cannot represent the color red with high lightness sufficiently.

On the other hand, compared to the LCD panel 600, the LCD panel 200 further includes a yellow subpixel Y. For that reason, if the LCD panel 200 and the backlight 700 are used in combination, the color temperature of the liquid crystal display device will decrease. Also, if the color temperature of the light emitted from the backlight 300 is simply set to be higher than that of the light emitted from the backlight 700 in order to minimize a decrease in the color temperature of such a liquid crystal display device, then the luminous efficacy of the backlight 300 decreases.

Figure 7:
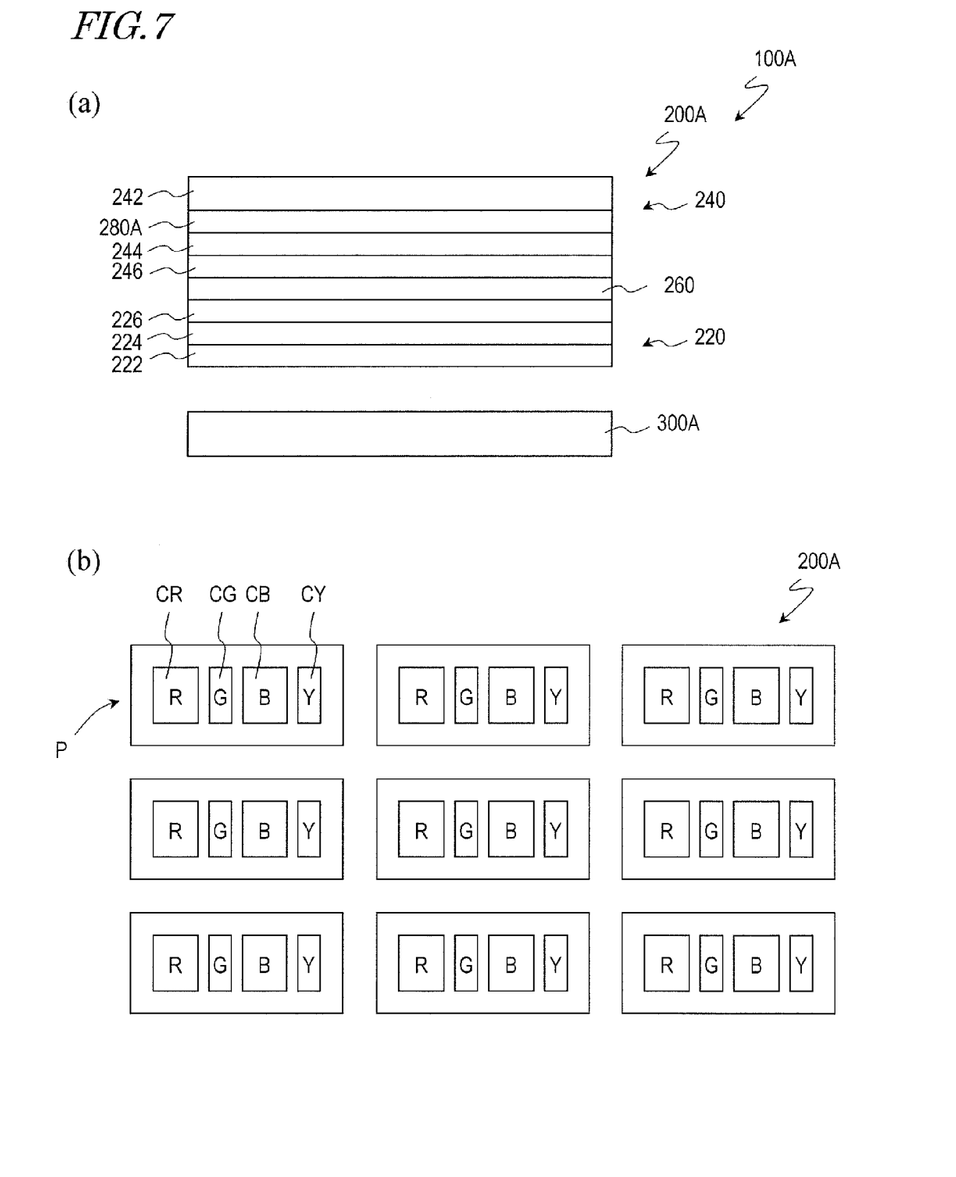
FIG. 7(a) is a schematic representation illustrating still another preferred embodiment of a liquid crystal display device according to the present invention and FIG. 7(b) is a schematic representation illustrating the LCD panel of that liquid crystal display device.

FIG. 7(a) is a schematic representation illustrating a liquid crystal display device 100A, which includes an LCD panel 200A and a backlight 300A. The liquid crystal display device 100A has the same configuration as the liquid crystal display device 100 described above except that the aperture areas $S_R$, $S_G$, $S_B$ and $S_Y$ of the red, green, blue, and yellow subpixels R, G, B and Y are not equal to each other. Thus, description of their common features will be omitted herein to avoid redundancies. The transmittance of the color filter layer 280A in the LCD panel 200A is different from that of the color filter layer 280 in the LCD panel 200. But the spectrum of the light emitted from the backlight 300A is different from that of the light emitted from the backlight 300.

FIG. 7(b) is a schematic representation illustrating the LCD panel 200A, in which the aperture areas $S_R$ and $S_B$ of the red and blue subpixels R and B are greater than the aperture areas $S_G$ and $S_Y$ of the green and yellow subpixels G and Y. Since the red subpixel R has a relatively large aperture area $S_R$ in this manner, the color red with high lightness can be represented sufficiently. In addition, since the blue subpixel B has a relatively large aperture area $S_B$, the decrease in the luminous efficacy of the backlight 300A can be minimized.

Specifically, the respective lengths of the red, green, blue, and yellow subpixels R, G, B and Y as measured in the column direction are equal to each other, and therefore, satisfy the ratio of 1:1:1:1. On the other hand, when measured in the row direction, the respective lengths of the red and blue subpixels R and B are greater than those of the green and yellow subpixels G and Y. For example, the respective lengths of the red, green, blue, and yellow subpixels R, G, B and Y as measured in the row direction may satisfy the ratio of 1.6:1.0:1.6:1.0. In that case, the respective aperture areas of the red, green, blue, and yellow subpixels R, G, B and Y also satisfy the ratio of 1.6:1.0:1.6:1.0.

Figure 8:
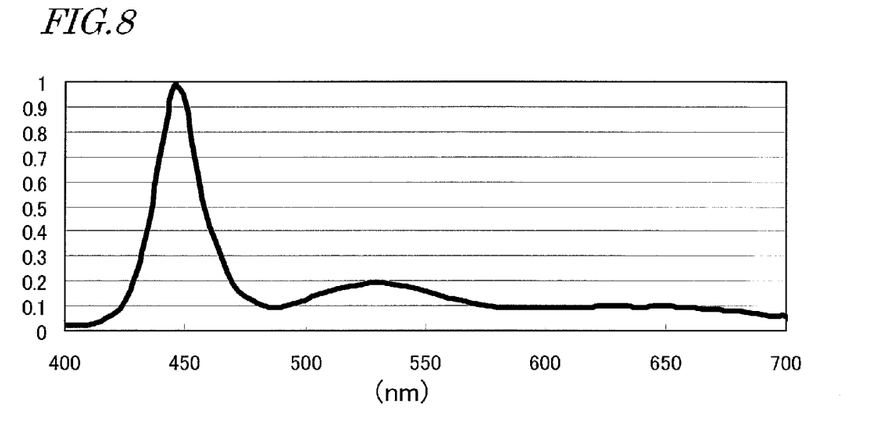
FIG. 8 shows the spectrum of the light emitted from the backlight of the liquid crystal display device shown in FIG. 7.

FIG. 8 shows the spectrum of the light emitted from the backlight 300A, which includes blue-emitting and red/green-fluorescent type LEDs. In the spectrum of the emitted light, the peak of the radiant intensity representing the color blue is higher than those of the radiant intensities representing the colors green and red, and the peak of the radiant intensity representing the color green is higher than that of the radiant intensity representing the colors red.

Next, the liquid crystal display device 100A of this preferred embodiment will be described with reference to Tables 5 and 6. The following Table 5 shows the aperture ratios and chromaticities x, y, u' and v' of the red, green, blue and yellow subpixels R, G, B and Y in the liquid crystal display device 100A of this preferred embodiment and the transmittances T of their associated color filters CR, CG, CB and CY:

TABLE 5

| Subpixel | Aperture ratio | x | y | u' | v' | T |
|---|---|---|---|---|---|---|
| Red subpixel | 1.6 | 0.639 | 0.333 | 0.447 | 0.524 | 19.0 |
| Green subpixel | 1.0 | 0.269 | 0.631 | 0.107 | 0.565 | 60.1 |
| Blue subpixel | 1.6 | 0.147 | 0.065 | 0.169 | 0.167 | 16.7 |
| Yellow subpixel | 1.0 | 0.426 | 0.533 | 0.196 | 0.561 | 83.0 |

The following Table 6 shows their chromaticities x, y, u' and v' when the liquid crystal display device 100A of this preferred embodiment displays the color yellow and the color white:

TABLE 6

| Displayed color | x | y | u' | v' |
|---|---|---|---|---|
| Yellow | 0.439 | 0.506 | 0.214 | 0.370 |
| White | 0.280 | 0.266 | 0.198 | 0.425 |

In this case, the color yellow can be displayed by setting the luminance of the blue subpixel to be the lowest one and the luminances of the red, green and yellow subpixels to be the highest ones. The color white can be displayed by setting the luminance of every subpixel to be the highest one. The liquid crystal display device 100A has a color temperature of 11600 K.

Figure 9:
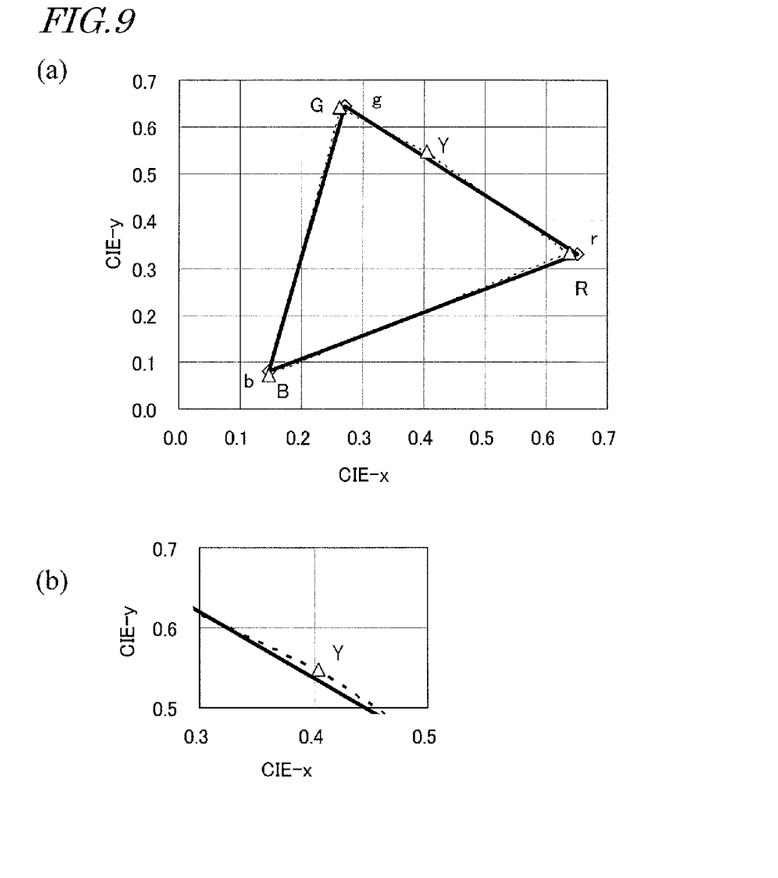
FIG. 9(a) is an xy chromaticity diagram illustrating, in comparison, the respective color reproduction ranges of the liquid crystal display device shown in FIG. 7 and the liquid crystal display device as the comparative example.
FIG. 9(b) illustrates, on a larger scale, a portion of the chromaticity diagram shown in FIG. 9(a).

FIG. 9 shows the result of comparison of the color reproduction range of the liquid crystal display device 100A to that of the liquid crystal display device 500 as the comparative example. In FIG. 9(a), R, G, B and Y denote the respective chromaticities of the red, green, blue, and yellow subpixels R, G, B and Y in the liquid crystal display device 100A and r, g, and b denote the respective chromaticities of the red, green, and blue subpixels r, g, and b in the liquid crystal display device 500. As can be seen from FIG. 9(a), the respective chromaticities of the red, green, and blue subpixels R, G, and B in the liquid crystal display device 100A are substantially equal to those of the red, green, and blue subpixels r, g, and b in the liquid crystal display device 500.

FIG. 9(b) shows, on a larger scale, a portion of the chromaticity diagram in the vicinity of the chromaticity of the yellow subpixel Y. As can be seen from FIGS. 9(a) and 9(b), the chromaticity of the yellow subpixel Y is located outside of the triangle that is defined by connecting together the respective chromaticities of the red, green and blue subpixels R, G and B, and the liquid crystal display device 100A has a broader color reproduction range than the liquid crystal display device 500 as the comparative example. As described above, the liquid crystal display device 500 of the comparative example has an NTSC ratio of 80.0% compliant with the CIE 1931 standard and an NTSC ratio of 86.7% compliant with the CIE 1976 standard. On the other hand, the liquid crystal display device 100A has an NTSC ratio of 81.7% compliant with the CIE 1931 standard and an NTSC ratio of 88.8% compliant with the CIE 1976 standard. Thus, the liquid crystal display device 100A has a higher NTSC ratio than the liquid crystal display device 500.

Also, as can be seen from Table 5, as the respective aperture areas $S_R$, $S_G$, $S_B$ and $S_Y$ of the red, green, blue, and yellow subpixels R, G, B and Y and the respective transmittances $T_R$, $T_G$, $T_B$ and $T_Y$ of their associated red, green, blue, and yellow color filters CR, CG, CB and CY satisfy the Inequality (A), the color filter layer 280A has a higher transmittance than the color filter layer 680. As described above, the color filter layer 680 in the liquid crystal display device 500 of the comparative example has a transmittance of 31.9%, while the color filter layer 280A in the liquid crystal display device 100A has a transmittance of 38.3%.

Figure 10:
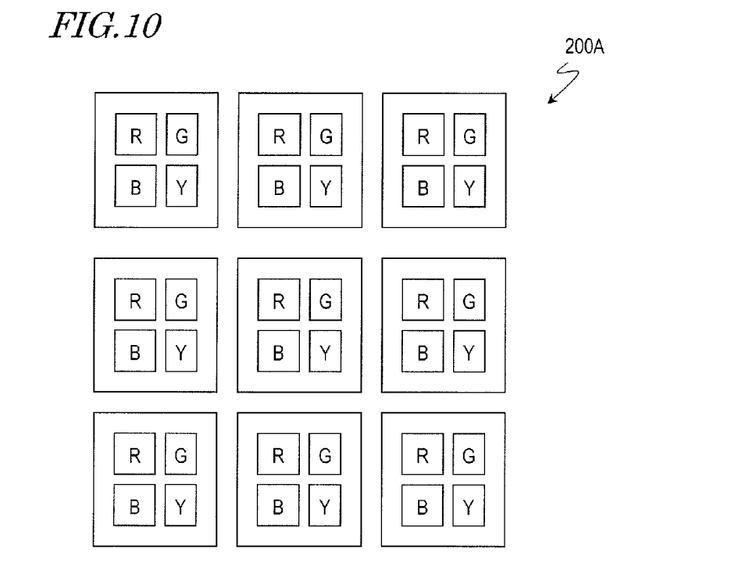
FIG. 10 is a schematic representation illustrating the LCD panel of a liquid crystal display device as yet another preferred embodiment of the present invention.

In the foregoing description, the red, green, blue, and yellow subpixels R, G, B and Y are supposed to be arranged in the Y direction. However, this is only an example of the present invention. Alternatively, the red, green, blue, and yellow subpixels R, G, B and Y may also be arranged in two columns and two rows to form a matrix pattern as shown in FIG. 10. In that case, subpixels with the larger aperture area may be arranged in line in the column direction, and subpixels with the smaller aperture area may also be arranged in line in the column direction. Specifically, the red and blue subpixels R and B may be arranged in line in the column direction and the green and yellow subpixels G and Y may be arranged in line in the column direction.

In the LCD panel 200A, the respective lengths of the red, green, blue, and yellow subpixels R, G, B and Y as measured in the column direction may be equal to each other, and therefore, may satisfy the ratio of 1:1:1:1. On the other hand, when measured in the row direction, the respective lengths of the red and blue subpixels R and B are greater than those of the green and yellow subpixels G and Y. For example, the respective lengths of the red, green, blue, and yellow subpixels R, G, B and Y as measured in the row direction may satisfy the ratio of 1.6:1.0:1.6:1.0. In that case, their aperture areas $S_R$, $S_G$, $S_B$ and $S_Y$ also satisfy the ratio of 1.6:1.0:1.6:1.0.

In the preferred embodiment described above, the respective aperture areas $S_R$ and $S_B$ of the red and blue subpixels R and B are supposed to be larger than the respective aperture areas $S_G$ and $S_Y$ of the green and yellow subpixels G and Y. However, the present invention is in no way limited to that specific preferred embodiment. Alternatively, the aperture area $S_R$ may be larger than the aperture areas $S_G$, $S_B$ and $S_Y$. Or the aperture area $S_B$ may be larger than the aperture areas $S_R$, $S_G$ and $S_Y$.

The LCD panels 200 and 200A of the liquid crystal display devices 100 and 100A may operate in 4DRTN mode, for example. The first and second alignment films 226 and 246 shown in FIGS. 1(a) and 7(a) are obtained by processing the surface of a vertical alignment film so that liquid crystal molecules have a pretilt angle of less than 90 degrees. In this description, the "pretilt angle" is the angle defined by the major axis of a liquid crystal molecule, which is aligned in the pretilt direction, with respect to the principal surface of the first and second alignment films 226 and 246. The pretilt directions of the liquid crystal molecules are defined by the first and second alignment films 226 and 246. Examples of known methods for forming such an alignment film include subjecting the alignment film to a rubbing treatment or an optical alignment treatment, by forming a microstructure on an undercoat film for each alignment film and transferring the pattern of the microstructure onto the surface of the alignment film, or by evaporating obliquely an inorganic material such as SiO on an alignment film to define a microstructure thereon. Considering its mass productivity, however, either the rubbing treatment or the optical alignment treatment is preferred. Among other things, the optical alignment treatment is particularly preferred to increase the yield because that treatment is a non-contact method and generates no static electricity due to friction unlike the rubbing treatment.

The liquid crystal layer 260 is a vertical alignment one and has liquid crystal molecules with negative dielectric anisotropy. The first and second alignment films 226 and 246 cause neighboring liquid crystal molecules to slightly tilt with respect to a normal to the principal surface of the alignment films 226 and 246. Their pretilt angle may fall within the range of 85 degrees to less than 90 degrees, for example. In this preferred embodiment, no chiral agent is added to the liquid crystal layer 260. And when a voltage is applied to the liquid crystal layer 260, the liquid crystal molecules in the liquid crystal layer 260 will have a twisted alignment under the alignment control force of the alignment films 226 and 246. If necessary, however, a chiral agent may be added to the liquid crystal layer 260. The liquid crystal layer 260 and two polarizers that are arranged as crossed Nicols are used in combination to conduct a display operation in normally black mode.

Figure 11:
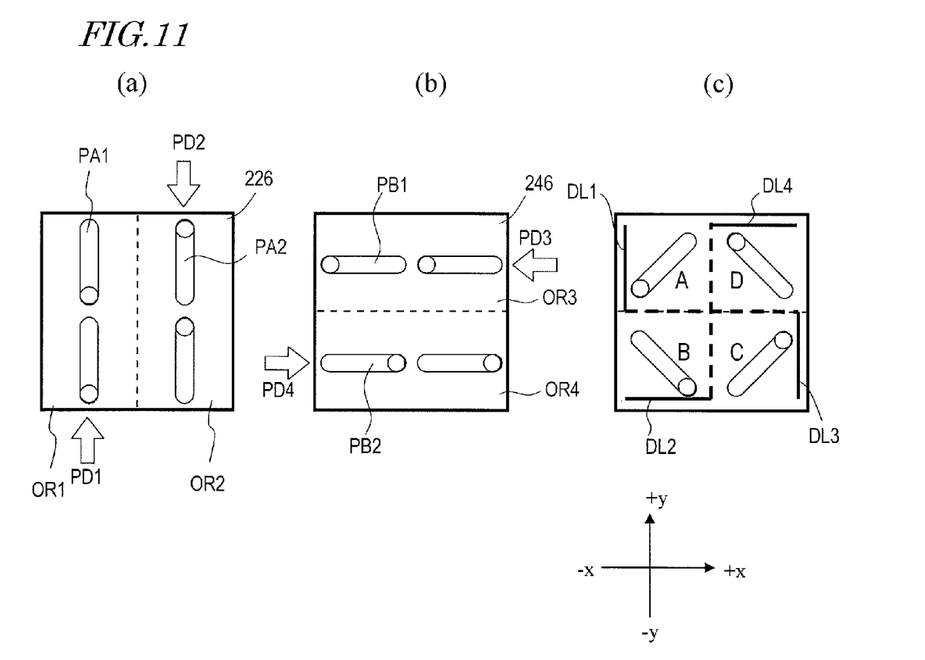
FIGS. 11(a), 11(b) and 11(c) are schematic representations illustrating the alignment directions of liquid crystal molecules in the LCD panel of the liquid crystal display devices shown in FIGS. 1 and 7.

Hereinafter, the pretilt directions defined by the first and second alignment films 226 and 246 for the liquid crystal molecules in a single pixel and the alignment directions of the liquid crystal molecules at the respective centers of the liquid crystal domains will be described with reference to FIG. 11.

FIG. 11(a) indicates the pretilt directions PA1 and PA2 of liquid crystal molecules as defined by the first alignment film 226 of the rear substrate 220. FIG. 11(b) indicates the pretilt directions PB1 and PB2 of liquid crystal molecules as defined by the second alignment film 246 of the front substrate 240. And FIG. 11(c) indicates the alignment directions of liquid crystal molecules at the respective centers of the liquid crystal domains A through D when a voltage is applied to the liquid crystal layer 260 and also shows domain lines DL1 to DL4, which look dark due to their disturbed alignment. It should be noted that the domain lines DL1 to DL4 are not so-called "disclination lines".

FIGS. 11(a) to 11(c) schematically indicate the alignment directions of the liquid crystal molecules as viewed by the viewer. Also, in FIGS. 11(a) to 11(c), the circular conical liquid crystal molecules tilt so that its (substantially round) bottom points at the viewer. Also, in FIGS. 11(a) to 11(c), the liquid crystal molecules tilt just slightly with respect to a normal to the principal surface of the first and second alignment films 226 and 246 (i.e., have relatively large tilt angles). As described above, in FIGS. 11(a) and 11(b), the pretilt angle may be in the range of 85 degrees to less than 90 degrees.

As shown in FIG. 11(a), the first alignment film 226 has first and second alignment regions OR1 and OR2. The liquid crystal molecules aligned by the first alignment region OR1 tilt in the −y direction with respect to a normal to the principal surface of the first alignment film 226. Meanwhile, the liquid crystal molecules aligned by the second alignment region OR2 tilt in the +y direction with respect to a normal to the principal surface of the first alignment film 226.

On the other hand, the second alignment film 246 has third and fourth alignment regions OR3 and OR4 as shown in FIG. 11(b). The liquid crystal molecules aligned by the third alignment region OR3 tilt in the +x direction with respect to a normal to the principal surface of the second alignment film 246 and their bottom in the −x direction faces forward. Meanwhile, the liquid crystal molecules aligned by the fourth alignment region OR4 of the second alignment film 246 tilt in the −x direction with respect to a normal to the principal surface of the second alignment film 246 and their bottom in the +x direction faces forward.

When formed by optical alignment treatment, the first and second alignment films 226 and 246 are irradiated obliquely with an ultraviolet ray. Even though their angles are not exactly the same, the liquid crystal molecules will tilt in almost the same direction as the direction in which the ultraviolet ray is coming. By irradiating obliquely the first and second alignment films 226 and 246 with an ultraviolet ray in the directions indicated by the arrows PD1 through PD4, the liquid crystal molecules will tilt obliquely with respect to a normal to the principal surface of the first and second alignment films 226 and 246.

As shown in FIG. 11(c), four liquid crystal domains A, B, C and D are formed in the liquid crystal layer 260. Specifically, a portion of the liquid crystal layer 260 that is sandwiched between the first alignment region OR1 of the first alignment film 226 and the third alignment region OR3 of the second alignment film 246 becomes the liquid crystal domain A. Another portion of the liquid crystal layer 260 that is sandwiched between the first alignment region OR1 of the first alignment film 226 and the fourth alignment region OR4 of the second alignment film 246 becomes the liquid crystal domain B. Still another portion of the liquid crystal layer 260 that is sandwiched between the second alignment region OR2 of the first alignment film 226 and the fourth alignment region OR4 of the second alignment film 246 becomes the liquid crystal domain C. And yet another portion of the liquid crystal layer 260 that is sandwiched between the second alignment region OR2 of the first alignment film 226 and the third alignment region OR3 of the second alignment film 246 becomes the liquid crystal domain D.

The alignment direction of liquid crystal molecules located at the center of the liquid crystal domain A through D becomes an intermediate direction between the two pretilt directions of liquid crystal molecules defined by the first and second alignment films 226 and 246. In the following description, the alignment direction of liquid crystal molecules at the center of a liquid crystal domain, which is the azimuthal component that points forward (i.e., from the rear side toward the front side along the major axis of liquid crystal molecules) will be referred to herein as a "reference alignment direction". The reference alignment direction is characteristic of its associated liquid crystal domain and has dominant influence on the viewing angle dependence of that liquid crystal domain. Supposing the counterclockwise direction with respect to the horizontal direction of the display screen (or the paper of the drawings) is positive (e.g., supposing the three o'clock direction defines an azimuthal angle of 0 degrees and the counterclockwise direction is positive if the display screen is compared to the face of a clock), the reference alignment directions of the four liquid crystal domains A through D are defined so that the difference between any two of those four directions becomes substantially an integral multiple of 90 degrees. Specifically, the azimuths of the liquid crystal domains A, B, C and D may be 225, 315, 45 and 135 degrees, respectively. Since the reference alignment direction are defined symmetrically in this manner, more uniform viewing angle characteristic is realized and the display quality is improved.

In the example described above, the azimuths of the liquid crystal domains A, B, C and D are supposed to be 225, 315, 45 and 135 degrees, respectively. However, this is just an example of the present invention. As long as the reference alignment directions of the four liquid crystal domains A through D are defined so that the difference between any two of those four directions becomes substantially an integral multiple of 90 degrees, the azimuths of the liquid crystal domains A, B, C and D may be any other values.

In the foregoing description, the liquid crystal display devices 100 and 100A are supposed to operate in the 4DRTN mode as an example. However, the present invention is in no way limited to that specific preferred embodiment. The liquid crystal display devices 100 and 100A may also operate in any other mode.

Furthermore, although LEDs are supposed to be used as the backlights 300 and 300A in the preferred embodiment described above, this is just an example of the present invention. Alternatively, cold cathode fluorescent lamps (CCFLs) may also be used as the backlights 300 and 300A.

Furthermore, even though the color filter layer 280 is supposed to be provided for the front substrate 240 in the preferred embodiment described above, this is only an example of the present invention. Alternatively, the color filter layer 280 may also be provided for the rear substrate 220.

Also, the LCD panels 200 and 200A described above are supposed to be transmission types. However, the present invention is in no way limited to that specific preferred embodiment. Optionally, the LCD panels 200 and 200A may also be reflection types as well. In the case of the reflection type, light that has been incident externally on the panel will pass through the color filter layer 280 twice. That is why the respective transmittances $T_R$, $T_G$, $T_B$ and $T_Y$ of the red, green, blue, and yellow color filters CR, CG, CB and CY can be represented as the squares of the transmittances when the light passes through the red, green, blue, and yellow color filters CR, CG, CB and CY only once. For example, if the transmittance is 40% in a situation where the light passes through the color filters only once, the transmittance will be 16% in the reflection type.

Still alternatively, in the LCD panels 200 and 200A, both a transmitting region and a reflecting region may be provided for each subpixel R, G, B, Y. That is to say, the LCD panels 200 and 200A may be transflective types, too. In such a transflective LCD panel, each of the transmittances $T_R$, $T_G$, $T_B$ and $T_Y$ of the red, green, blue, and yellow color filters CR, CG, CB and CY may be represented as the sum of the product of the area and transmittance of the transmitting region and that of the area and transmittance of the reflecting region.

INDUSTRIAL APPLICABILITY

The liquid crystal display device of the present invention can not only expand the color reproduction range but also minimize a decrease in the transmittance of the color filter layer.

| REFERENCE SIGNS LIST | |
|---|---|
| 100 | liquid crystal display device |
| 200 | LCD panel |
| 220 | rear substrate |
| 222 | insulating substrate |
| 224 | pixel electrode |
| 226 | first alignment film |
| 240 | front substrate |
| 242 | insulating substrate |
| 244 | counter electrode |
| 246 | second alignment film |
| 260 | liquid crystal layer |
| 280 | color filter layer |
| 300 | backlight |

The invention claimed is:

1. A liquid crystal display device that has a pixel, which includes red, green, blue and yellow subpixels, and that comprises
a backlight, and
a liquid crystal panel,
wherein the liquid crystal panel includes a color filter layer that has red, green, blue and yellow color filters associated with the red, green, blue and yellow subpixels, respectively, and
wherein the chromaticity of the yellow subpixel is outside of a triangle that is defined by connecting together the respective chromaticities of the red, green and blue subpixels, and
wherein the respective aperture areas $S_R$, $S_G$, $S_B$ and $S_Y$ of the red, green, blue, and yellow subpixels and the respective transmittances $T_R$, $T_G$, $T_B$ and $T_Y$ of the red, green, blue, and yellow color filters satisfy the inequality $T_Y > [(S_R+S_G+S_B+S_Y)(T_R+T_G+T_B)-3(S_R \times T_R+S_G \times T_G+S_B \times T_B)]/3S_Y.$ 2. The liquid crystal display device of claim 1, wherein at least one of the red, green, blue, and yellow subpixels has a different aperture area from any of the other subpixels.

3. The liquid crystal display device of claim 1, wherein the red subpixel has a larger aperture area than the green and yellow subpixels, and
wherein the blue subpixel has a larger aperture area than the green and yellow subpixels.

4. The liquid crystal display device of claim 1, wherein the respective aperture areas of the red, green, blue, and yellow subpixels are substantially equal to each other.

5. The liquid crystal display device of claim 4, wherein the transmittance of the yellow color filter is higher than the arithmetic mean of the respective transmittances of the red, green and blue color filters.

* * * * *